(12) United States Patent
Kozak et al.

(10) Patent No.: US 10,967,884 B2
(45) Date of Patent: Apr. 6, 2021

(54) METHOD AND APPARATUS FOR TAKING AN ACTION BASED UPON MOVEMENT OF A PART OF A VEHICLE INTO A PATH OF TRAVEL

(71) Applicant: HERE Global B.V., Eindhoven (NL)

(72) Inventors: Frank Kozak, Chicago, IL (US); Chris Dougherty, Highland Park, IL (US)

(73) Assignee: HERE GLOBAL B.V., Eindhoven (NL)

( * ) Notice: Subject to any disclaimer, the term of this patent is extended or adjusted under 35 U.S.C. 154(b) by 4 days.

(21) Appl. No.: 16/297,114

(22) Filed: Mar. 8, 2019

(65) Prior Publication Data

US 2020/0283012 A1   Sep. 10, 2020

(51) Int. Cl.
| | |
|---|---|
| *B60W 50/14* | (2020.01) |
| *B60W 30/095* | (2012.01) |
| *B60R 21/34* | (2011.01) |
| *G08G 1/16* | (2006.01) |
| *B60W 30/09* | (2012.01) |

(52) U.S. Cl.
CPC .............. *B60W 50/14* (2013.01); *B60R 21/34* (2013.01); *B60W 30/09* (2013.01); *B60W 30/0956* (2013.01); *G08G 1/166* (2013.01); *B60W 2050/143* (2013.01)

(58) Field of Classification Search
CPC ......... B60W 50/14; H04W 4/46; G08G 1/166
USPC ....................................................... 340/435
See application file for complete search history.

(56) References Cited

U.S. PATENT DOCUMENTS

| | | | | |
|---|---|---|---|---|
| 10,304,341 | B1* | 5/2019 | Crasso | ............ H04W 4/46 |
| 2005/0134440 | A1* | 6/2005 | Breed | ............. G01S 17/89 |
| | | | | 340/435 |
| 2007/0188312 | A1* | 8/2007 | Bihler | .......... B60R 21/0134 |
| | | | | 340/435 |
| 2016/0325835 | A1 | 11/2016 | Abuelsaad et al. | |

(Continued)

FOREIGN PATENT DOCUMENTS

| | | |
|---|---|---|
| CN | 201677807 U | 12/2010 |
| IN | 2018 11008146 A | 4/2018 |
| WO | WO 2071/083936 A1 | 5/2017 |

OTHER PUBLICATIONS

Cyclist-Protecting Robots : Cyclodrone by Frog Design [online] [retrieved May 2, 2019]. Retrieved from the Internet: <URL: https://www.trendhunter.com/trends/cyclodrone-by-frog-design>. (dated Jan. 30, 2014) 3 pages.

(Continued)

*Primary Examiner* — Qutbuddin Ghulamali
(74) *Attorney, Agent, or Firm* — Alston & Bird LLP (57) ABSTRACT

A method, apparatus and computer program product are provided, for example, to detect and to provide alerting of a part of a vehicle subsequently moving into the path of travel of a bicyclist or other vehicle. In the context of a method, one or more events indicative of a part of a vehicle subsequently moving into a path of a bicyclist are detected. The method also includes taking an action, responsive to detection of the one or more events, to reduce the risk to a person outside the vehicle or another vehicle proximate the door of the vehicle, such as by providing an alert as to the vehicle subsequently moving into the path of the bicyclist or to at least temporarily prevent the vehicle from subsequently moving into the path of the bicyclist.

20 Claims, 5 Drawing Sheets

(56) References Cited

U.S. PATENT DOCUMENTS

2018/0061235 A1    3/2018  Goldberg et al.
2018/0186283 A1    7/2018  Fischer et al.

OTHER PUBLICATIONS

Dooring—Wikipedia [online] [retrieved May 2, 2019]. Retrieved from the Internet: <URL: https://web.archive.org/web/20180527225109/https://en.wikipedia.org/wiki/Dooring>. (dated May 21, 2018) 4 pages.

Self-Driving Car Crashes are Inevitable. Count a Flying Airbag Help? [online [retrieved May 3, 2019]. Retrieved from the Internet: <URL: https://www.fastcompany.com/90158129/self-driving-car-crashes-are-inevitable-could-a-flying-airbag-help> (dated Jan. 26, 2018) 4 pages (downloaded by chrome-extension://bpconcjcam-mlapcognnelfmaeghhagi/edit.html).

* cited by examiner

METHOD AND APPARATUS FOR TAKING AN ACTION BASED UPON MOVEMENT OF A PART OF A VEHICLE INTO A PATH OF TRAVEL

TECHNOLOGICAL FIELD

An example embodiment relates generally to taking an action based upon movement of a part of a vehicle into the path of travel of a bicyclist or another vehicle in order to reduce the risk to the bicyclist or the other vehicle.

BACKGROUND

Vehicles frequently park alongside or immediately adjacent to a lane of traffic. For example, a road may include one or more lanes of traffic extending in each of two opposed directions. Along one or both opposed sides of the road, vehicles may be permitted to park, at least during certain days and/or certain times of days. As such, traffic, such as both vehicular traffic and bicyclists, passes adjacent to the parked vehicles.

As a result of the proximity of the parked vehicles to the lanes of traffic, a parked vehicle may create issues for the traffic passing nearby. For example, an occupant of a parked vehicle may open the door of the parked vehicle into a lane of traffic. A bicyclist or another vehicle traveling along the road may then strike the open door, thereby potentially damaging the bicycle and/or the vehicles and also subjecting the bicyclist and/or the occupant of the vehicle to injury.

Alternatively, a bicyclist or another vehicle traveling along the road may swerve away from the parked vehicle in response to the sudden opening of the door of the parked vehicle. Although this evasive maneuver may avoid the open door, the bicyclist or other vehicle may advertently swerve into another lane of traffic and, as such, be involved in a traffic accident in instances in which other vehicles are in the other lane of traffic.

Parked vehicles may create other types of issues for a bicyclist and other vehicles traveling along the road adjacent to the parked vehicle. For example, the driver of the vehicle that has been parked along a road may cause the vehicle to pull out from the parking space and into a lane of traffic. Even in instances in which the driver of the vehicle that has been parked checks for oncoming traffic, a bicyclist or other vehicles approaching the parked vehicle may be difficult to see in light of the relative position of the parked vehicle to the path of travel the bicyclist or other vehicle. As such, the driver of a vehicle that has been parked may cause the vehicle to be pulled out from a parking space into a lane of traffic in front of an approaching bicyclist or other vehicle, thereby creating an obstacle for the bicyclist or other vehicle. In some instances, the bicyclist or other vehicle may collide with the vehicle that was previously parked and that has now pulled out of the parking space and into the lane of traffic, while in other instances, the bicyclist or the other vehicle may take evasive action by swerving into another lane of traffic or coming to an abrupt halt in order to avoid the vehicle that was previously parked and that has now pulled out of the parking space and into the lane of traffic. Such evasive actions taken by the bicyclist or the other vehicle create the possibility of a traffic accident with yet another vehicle traveling along the road.

BRIEF SUMMARY

A method, apparatus and computer program product are provided in accordance with an example embodiment in order to detect a least one event indicative of a part of a vehicle moving into the path of travel of a bicyclist or other vehicle and, in response to the detection the at least one event, to cause an action to be taken, such as the provision of an alert as to the movement of part of the vehicle into the path of travel or the at least temporary prevention of the part of the vehicle from moving into the path of travel. Based upon the action that is taken, the likelihood of an accident between the approaching bicyclist or other vehicle and the vehicle that is planning to move into the path of travel may be reduced. For example, based upon the alert, the bicyclist, the driver of the other vehicle and/or the driver of the vehicle that was previously parked may be forewarned such that evasive action may be taken, if necessary, at an earlier stage and in a more calculated manner so as to reduce the risk of a traffic accident. In one embodiment, a method, apparatus and computer program product are provided to detect at least one event indicative of a door of a vehicle being opened, while in another embodiment, a method, apparatus and computer program product are provided in order to detect a vehicle pulling from a stationary position out into a lane of travel. In either embodiment, the action may be taken in order to reduce the risk of a traffic accident attributable to the door of the vehicle being opened or the vehicle subsequently pulling out into the lane of travel.

In an example embodiment, a method is provided that includes detecting one or more events indicative of a door of a vehicle being opened. Responsive to detection of the one or more events, the method also includes taking an action to reduce a risk to a person outside the vehicle or another vehicle proximate the door of the vehicle being opened.

The method of an example embodiment also includes determining that a bicyclist or another vehicle is approaching the vehicle. In this example embodiment, the detection of one or more events is responsive to a determination that the bicyclist or the another vehicle is approaching the vehicle. The method of this example embodiment takes the action by causing at least one of the bicyclist or the another vehicle approaching the vehicle or the person onboard the vehicle to be provided notification. In this example embodiment, the method further includes determining whether one or more events continue to be detected following the notification that is indicative of the door of the vehicle being opened and, in an instance in which the one or more events continue to be detected, triggering another action to be taken to at least temporarily prevent the door of the vehicle from being at least fully opened, such as by causing the door of the vehicle to be locked to prevent the door of the vehicle from being opened. The method of this example embodiment also includes determining that the bicyclist or the another vehicle has passed the vehicle and, responsive to a determination that the bicyclist or the another vehicle has passed the vehicle, causing the another action to be discontinued.

The method of an example embodiment detects one or more events by detecting a sequence of events, while the vehicle is stationary, indicative of the door of the vehicle being subsequently opened. In an example embodiment, the method detects one or more events indicative of the door of the vehicle being subsequently opened by detecting one or more events selected from the group consisting of: the person being onboard the vehicle, a transmission of the vehicle being in park, an engine of the vehicle being off, the vehicle having come to a halt within a first predefined period of time, a part of the vehicle being indicative of having been recently operated, a person having entered the vehicle within a second predefined period of time, lettering or signage on the vehicle indicative of the vehicle being a taxi, and a medallion, decal or sign carried by the vehicle indicative of the vehicle providing ride share services.

In another example embodiment, an apparatus is provided that includes at least one processor and at least one non-transitory memory including computer program code instructions stored therein with the computer program code instructions configured to, when executed by the at least one processor, cause the apparatus at least to detect one or more events indicative of a door of a vehicle being opened. Responsive to detection of the one or more events, the computer program code instructions are also configured to, when executed by the at least one processor, cause the apparatus to take an action to reduce a risk to a person outside the vehicle or another vehicle proximate the door of the vehicle being opened.

The computer program code instructions are also configured to, when executed by the at least one processor, cause the apparatus of an example embodiment to determine that a bicyclist or another vehicle is approaching the vehicle. In this example embodiment, the detection of one or more events is responsive to a determination that the bicyclist or the another vehicle is approaching the vehicle. The computer program code instructions of this example embodiment that are configured to take the action include computer program code instructions configured to cause at least one of the bicyclist or the another vehicle approaching the vehicle or the person onboard the vehicle to be provided notification. In this example embodiment, the computer program code instructions are also configured to, when executed by the at least one processor, cause the apparatus to determine whether one or more events continue to be detected following the notification that is indicative of the door of the vehicle being opened and, in an instance in which the one or more events continue to be detected, to trigger another action to be taken to at least temporarily prevent the door of the vehicle from being at least fully opened, such as by causing the door of the vehicle to be locked to prevent the door of the vehicle from being opened. The computer program code instructions are also configured to, when executed by the at least one processor, cause the apparatus of this example embodiment to determine that the bicyclist or the another vehicle has passed the vehicle and, responsive to a determination that the bicyclist or the another vehicle has passed the vehicle, cause the another action to be discontinued.

The computer program code instructions of an example embodiment that are configured to detect one or more events include computer program code instructions configured to detect a sequence of events, while the vehicle is stationary, indicative of the door of the vehicle being opened. In an example embodiment, the computer program code instructions that are configured to detect one or more events indicative of the door of the vehicle being subsequently opened include computer program code instructions configured to detect one or more events selected from the group consisting of: the person being onboard the vehicle, a transmission of the vehicle being in park, an engine of the vehicle being off, the vehicle having come to a halt within a first predefined period of time, a part of the vehicle being indicative of having been recently operated, a person having entered the vehicle within a second predefined period of time, lettering or signage on the vehicle indicative of the vehicle being a taxi, and a medallion, decal or sign carried by the vehicle indicative of the vehicle providing ride share services.

In a further example embodiment, a computer program product is provided that includes at least one non-transitory computer-readable storage medium having computer-executable program code instructions stored therein with the computer-executable program code instructions including program code instructions configured to detect one or more events indicative of a door of a vehicle being opened. Responsive to detection of the one or more events, the computer-executable program code instructions also include program code instructions configured to take an action to reduce a risk to a person outside the vehicle or another vehicle proximate the door of the vehicle being opened.

The computer-executable program code instructions of an example embodiment also include program code instructions configured to determine that a bicyclist or another vehicle is approaching the vehicle. In this example embodiment, the detection of one or more events is responsive to a determination that the bicyclist or the another vehicle is approaching the vehicle. The program code instructions configured to take the action include, in one example embodiment, program code instructions configured to cause at least one of the bicyclist or the another vehicle approaching the vehicle or the person onboard the vehicle to be provided notification. In this example embodiment, the computer-executable program code instructions of an example embodiment also include program code instructions configured to determine whether one or more events continue to be detected following the notification that is indicative of the door of the vehicle being opened and, in an instance in which the one or more events continue to be detected, to trigger another action to be taken to at least temporarily prevent the door of the vehicle from being at least fully opened, such as by causing the door of the vehicle to be locked to prevent the door of the vehicle from being opened. The computer-executable program code instructions of an example embodiment also include program code instructions configured to determine that the bicyclist or the another vehicle has passed the vehicle and, responsive to a determination that the bicyclist or the another vehicle has passed the vehicle, to cause the another action to be discontinued.

The program code instructions configured to detect one or more events include, in on example embodiment, program code instructions configured to detect a sequence of events, while the vehicle is stationary, indicative of the door of the vehicle being subsequently opened. In an example embodiment, the program code instructions configured to detect one or more events indicative of the door of the vehicle being opened include program code instructions configured to detect one or more events selected from the group consisting of: the person being onboard the vehicle, a transmission of the vehicle being in park, an engine of the vehicle being off, the vehicle having come to a halt within a first predefined period of time, a part of the vehicle being indicative of having been recently operated, a person having entered the vehicle within a second predefined period of time, lettering or signage on the vehicle indicative of the vehicle being a taxi, and a medallion, decal or sign carried by the vehicle indicative of the vehicle providing ride share services.

In an example embodiment, a method is provided that includes detecting one or more events indicative of a vehicle subsequently pulling, from a stationary position, out into a lane of travel. The method also includes taking an action, responsive to detection of the one or more events, to reduce a risk of accident attributable to the vehicle pulling out into the lane of travel.

The method of an example embodiment further includes determining that a bicyclist or another vehicle is approaching the vehicle. The detection of one or more events is responsive to a determination that the bicyclist or the another vehicle is approaching the vehicle. In an example embodiment, the method takes the action by causing at least one of the bicyclist or the another vehicle approaching the vehicle or the person onboard the vehicle to be provided notification. The method of an example embodiment further includes determining whether one or more events continue to be detected following the notification that is indicative of the vehicle subsequently pulling out into the lane of travel and, in an instance in which the one or more events continue to be detected, triggering another action to be taken to at least temporarily prevent the vehicle from pulling out into the lane of travel. In an example embodiment, the method triggers the another action to be taken by causing a transmission of the vehicle to be placed in park or an engine of the vehicle to be turned off to prevent the vehicle from pulling out into the lane of travel. In an example embodiment, the method further includes determining that the bicyclist or the another vehicle has passed the vehicle and, responsive to a determination that the bicyclist or the another vehicle has passed the vehicle, causing the another action to be discontinued.

The method of an example embodiment detects one or more events by detecting a sequence of events, while the vehicle is stationary, indicative of the vehicle subsequently pulling out into the lane of travel. In an example embodiment, the method detects one or more events indicative of the vehicle subsequently pulling out into the lane of travel by detecting one or more events selected from the group consisting of: the person being onboard the vehicle, a transmission of the vehicle being in gear, an engine of the vehicle running, brakes of the vehicle having been released and a steering wheel of the vehicle or a wheel of the vehicle having been moved within a first predefined period of time.

In another example embodiment, an apparatus is provided that includes at least one processor and at least one non-transitory memory including computer program code instructions stored therein with the computer program code instructions configured to, when executed by the at least one processor, cause the apparatus at least to detect one or more events indicative of a vehicle subsequently pulling, from a stationary position, out into a lane of travel. The computer program code instructions are also configured to, when executed by the at least one processor, cause the apparatus to take an action, responsive to detection of the one or more events, to reduce a risk of accident attributable to the vehicle pulling out into the lane of travel.

The computer program code instructions are further configured to, when executed by the at least one processor, cause the apparatus of an example embodiment to determine that a bicyclist or another vehicle is approaching the vehicle. The detection of one or more events is responsive to a determination that the bicyclist or the another vehicle is approaching the vehicle. In an example embodiment, the computer program code instructions configured to take the action include computer program code instructions configured to cause at least one of the bicyclist or the another vehicle approaching the vehicle or the person onboard the vehicle to be provided notification. The computer program code instructions of an example embodiment are further configured to, when executed by the at least one processor, cause the apparatus to determine whether one or more events continue to be detected following the notification that is indicative of the vehicle subsequently pulling out into the lane of travel and, in an instance in which the one or more events continue to be detected, to trigger another action to be taken to at least temporarily prevent the vehicle from pulling out into the lane of travel. The computer program code instructions configured to trigger the another action to be taken include, in an example embodiment, computer program code instructions configured to cause a transmission of the vehicle to be placed in park or an engine of the vehicle to be turned off to prevent the vehicle from pulling out into the lane of travel. In an example embodiment, the computer program code instructions are further configured to, when executed by the at least one processor, cause the apparatus to determine that the bicyclist or the another vehicle has passed the vehicle and, responsive to a determination that the bicyclist or the another vehicle has passed the vehicle, cause the another action to be discontinued.

The computer program code instructions configured to detect one or more events include, in an example embodiment, computer program code instructions configured to detect a sequence of events, while the vehicle is stationary, indicative of the vehicle subsequently pulling out into the lane of travel. In an example embodiment, the computer program code instructions configured to detect one or more events indicative of the vehicle subsequently pulling out into the lane of travel include computer program code instructions configured to detect one or more events selected from the group consisting of: the person being onboard the vehicle, a transmission of the vehicle being in gear, an engine of the vehicle running, brakes of the vehicle having been released and a steering wheel of the vehicle or a wheel of the vehicle having been moved within a first predefined period of time.

In a further example embodiment, a computer program product is provided that includes at least one non-transitory computer-readable storage medium having computer-executable program code instructions stored therein with the computer-executable program code instructions including program code instructions configured to detect one or more events indicative of a vehicle subsequently pulling, from a stationary position, out into a lane of travel. The computer-executable program code instructions also include program code instructions configured to take an action, responsive to detection of the one or more events, to reduce a risk of accident attributable to the vehicle pulling out into the lane of travel.

The computer-executable program code instructions of an example embodiment also include program code instructions configured to determine that a bicyclist or another vehicle is approaching the vehicle. The detection of one or more events is responsive to a determination that the bicyclist or the another vehicle is approaching the vehicle. In an example embodiment, the method takes the action by causing at least one of the bicyclist or the another vehicle approaching the vehicle or the person onboard the vehicle to be provided notification. The computer-executable program code instructions of an example embodiment also include program code instructions configured to determine whether one or more events continue to be detected following the notification that is indicative of the vehicle subsequently pulling out into the lane of travel and, in an instance in which the one or more events continue to be detected, to trigger another action to be taken to at least temporarily prevent the vehicle from pulling out into the lane of travel. In an example embodiment, the program code instructions configured to trigger the another action to be taken include program code instructions configured to cause a transmission of the vehicle to be placed in park or an engine of the vehicle to be turned off to prevent the vehicle from pulling out into the lane of travel. In an example embodiment, the computer-executable program code instructions of an example embodiment also include program code instructions configured to determine that the bicyclist or the another vehicle has passed the vehicle and, responsive to a determination that the bicyclist or the another vehicle has passed the vehicle, to cause the another action to be discontinued.

The program code instructions configured to configured to detect one or more events include, in one example embodiment, program code instructions configured to detect a sequence of events, while the vehicle is stationary, indicative of the vehicle subsequently pulling out into the lane of travel. In an example embodiment, the program code instructions configured to detect one or more events indicative of the vehicle subsequently pulling out into the lane of travel include program code instructions configured to detect one or more events selected from the group consisting of: the person being onboard the vehicle, a transmission of the vehicle being in gear, an engine of the vehicle running, brakes of the vehicle having been released and a steering wheel of the vehicle or a wheel of the vehicle having been moved within a first predefined period of time.

In an example embodiment, a method is provided that includes detecting one or more events indicative of at least a part of a vehicle, such as a door of the vehicle, subsequently moving into a path of a bicyclist. The method also includes taking an action, responsive to detection of the one or more events, to reduce a risk to the bicyclist attributable to the vehicle subsequently moving into the path of the bicyclist.

The method of an example embodiment also includes program code instructions configured to determine that the bicyclist is approaching the vehicle. The detection of one or more events is responsive to a determination that the bicyclist is approaching the vehicle. In an example embodiment, the method detects one or more events by detecting a sequence of events, while the vehicle is stationary, indicative of the at least a part of the vehicle subsequently moving into a path of the bicyclist. The method of an example embodiment takes the action by causing at least one of the bicyclist approaching the vehicle or the person onboard the vehicle to be provided a notification. In this example embodiment, the method also includes determining whether one or more events continue to be detected following the notification as to the part of the vehicle subsequently moving into the path of the bicyclist and, in an instance in which the one or more events continue to be detected, triggering another action to be taken to at least temporarily prevent the part of the vehicle from subsequently moving into the path of the bicyclist.

In another example embodiment, an apparatus is provided that includes at least one processor and at least one non-transitory memory including computer program code instructions stored therein with the computer program code instructions configured to, when executed by the at least one processor, cause the apparatus at least to detect one or more events indicative of at least a part of a vehicle, such as a door of the vehicle, subsequently moving into a path of a bicyclist. The computer program code instructions are also configured to, when executed by the at least one processor, cause the apparatus to take an action, responsive to detection of the one or more events, to reduce a risk to the bicyclist attributable to the vehicle subsequently moving into the path of the bicyclist.

The computer program code instructions are also configured to, when executed by the at least one processor, cause the apparatus of an example embodiment to determine that the bicyclist is approaching the vehicle. The detection of one or more events is responsive to a determination that the bicyclist is approaching the vehicle. In an example embodiment, the computer program code instructions configured to detect one or more events include computer program code instructions configured to detect a sequence of events, while the vehicle is stationary, indicative of the at least a part of the vehicle subsequently moving into a path of the bicyclist. The computer program code instructions of an example embodiment that are configured to take the action include computer program code instructions configured to cause at least one of the bicyclist approaching the vehicle or the person onboard the vehicle to be provided a notification. In this example embodiment, the computer program code instructions are also configured to, when executed by the at least one processor, cause the apparatus to determine whether one or more events continue to be detected following the notification as to the part of the vehicle subsequently moving into the path of the bicyclist and, in an instance in which the one or more events continue to be detected, to trigger another action to be taken to at least temporarily prevent the part of the vehicle from subsequently moving into the path of the bicyclist.

In a further example embodiment, a computer program product is provided that includes at least one non-transitory computer-readable storage medium having computer-executable program code instructions stored therein with the computer-executable program code instructions comprising program code instructions configured to detect one or more events indicative of at least a part of a vehicle, such as a door of the vehicle, subsequently moving into a path of a bicyclist. The computer-executable program code instructions also include program code instructions configured to take an action, responsive to detection of the one or more events, to reduce a risk to the bicyclist attributable to the vehicle subsequently moving into the path of the bicyclist.

The computer-executable program code instructions of an example embodiment also include program code instructions configured to determine that the bicyclist is approaching the vehicle. The detection of one or more events is responsive to a determination that the bicyclist is approaching the vehicle. In an example embodiment, the program code instructions configured to detect one or more events include program code instructions configured to detect a sequence of events, while the vehicle is stationary, indicative of the at least a part of the vehicle subsequently moving into a path of the bicyclist. The program code instructions of an example embodiment that are configured to take the action include program code instructions configured to cause at least one of the bicyclist approaching the vehicle or the person onboard the vehicle to be provided a notification. In this example embodiment, the computer-executable program code instructions also include program code instructions configured to determine whether one or more events continue to be detected following the notification as to the part of the vehicle subsequently moving into the path of the bicyclist and, in an instance in which the one or more events continue to be detected, trigger another action to be taken to at least temporarily prevent the part of the vehicle from subsequently moving into the path of the bicyclist.

BRIEF DESCRIPTION OF THE SEVERAL VIEWS OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Figure 1:
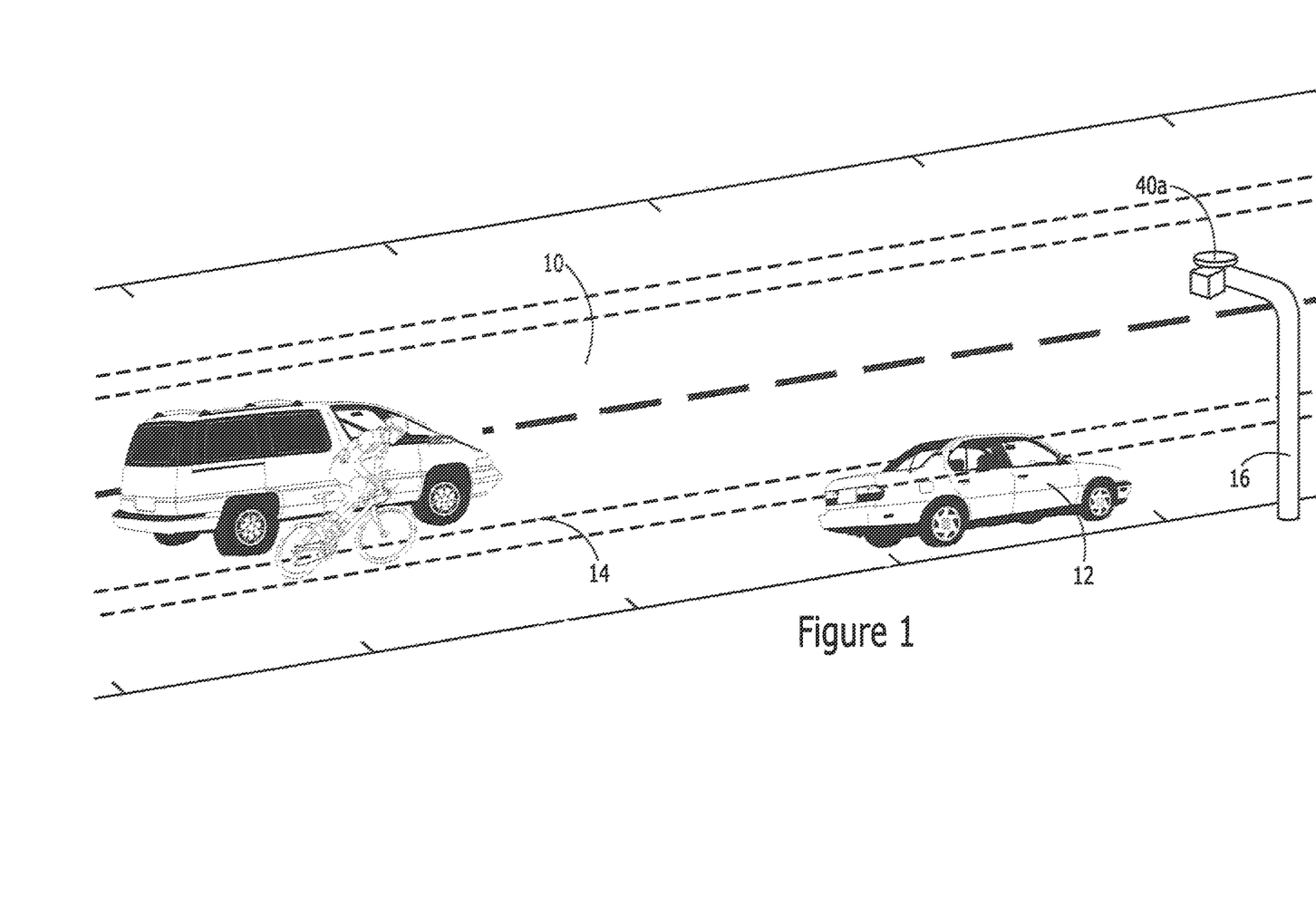
FIG. 1 is a perspective view of a vehicle that is parked alongside a road and a bicyclist approaching the parked vehicle in an adjacent lane of travel.

Parked vehicles create a variety of obstacles for bicyclist and other vehicles that travel along a lane of a road adjacent the parked vehicle. As shown in FIG. 1, for example, a road 10 may include two lanes of traffic to support travel in two opposed directions. The road may also include parking spots along the side of the road for vehicles. Parking spaces may be marked as shown in FIG. 1 or unmarked. Vehicles may park in the parking spaces in various relative positions with respect to the lanes of travel defined by the road. As shown in FIG. 1, a vehicle 12 may park adjacent the lane of travel such that the parked vehicle remains parallel to the lane of travel and oriented in the same direction in which a bicyclist or other vehicles are traveling. Alternatively, angled parking spaces may be defined adjacent a lane of travel of a road. In this instance, vehicles are parked at an angle, such as 45 degrees, relative to the path of travel defined by a lane of the road.

In the illustrated embodiment, the road 10 not only defines two opposed lanes of travel for vehicular traffic, but the road defines a bicycle lane 14 between the lane of travel for vehicular traffic and the parking spaces. The bicycle lane of this example embodiment is immediately adjacent the parking spaces, while the lane of travel for vehicular traffic is separated from the parking spaces by the bicycle lane. In other embodiments, however, the road does not define a bicycle lane and, instead, bicyclists ride in the same lane as other vehicular traffic such that both bicyclist and the other vehicular traffic are immediately adjacent the parking spaces defined by the road.

In order to reduce the risks associated with unexpected movement of a part of a vehicle 12 that has been parked alongside a road 10 into the path of travel of a bicyclist or other vehicle, such as the risk occasioned by dooring in which the door of a parked vehicle is unexpectedly opened into the path of travel or a vehicle that was previously parked pulling out from a parking space into the path of travel, a method, apparatus and computer program product are provided in accordance with an example embodiment in order to detect at least one event indicative of a part of the vehicle moving into the path of travel of a bicyclist or other vehicle and, in response, take an action to reduce the risk of accident attributable to the part of the vehicle moving into the path of travel of the bicyclist or the other vehicle, such as by providing an alert as to the part of the vehicle subsequently pulling into the path of travel or at least temporarily preventing the vehicle from subsequently pulling into the path of travel.

The apparatus of this example embodiment may be embodied by any of a variety of computing devices, such as a computer, a mobile terminal, such as a personal digital assistant (PDA), mobile telephone, smart phone, personal navigation device, wearable device, smart watch, tablet computer and/or other device that can perform navigation-related functions, such as digital routing and map display, or a fixed computing device, such as a computer workstation, a navigation system or the like.

The computing device of an example embodiment may be onboard a vehicle, such as the parked vehicle or another vehicle. In this embodiment, the computing device may be embodied, for example, by a navigation system of the vehicle. Still further, the computing device may be embodied by a mobile device carried by a bicyclist or by an occupant of one or more of the vehicles, such as a mobile terminal. In yet other embodiments, the computing device is a fixed computing device associated with a geographical region, e.g., a city block, such as a computing device embodied by a smart street lamp or the like. The computing device of some embodiments is distributed and includes a plurality of computing devices, such as one or more of the computing devices described above, that cooperate in order to perform the functions described below.

Figure 2:
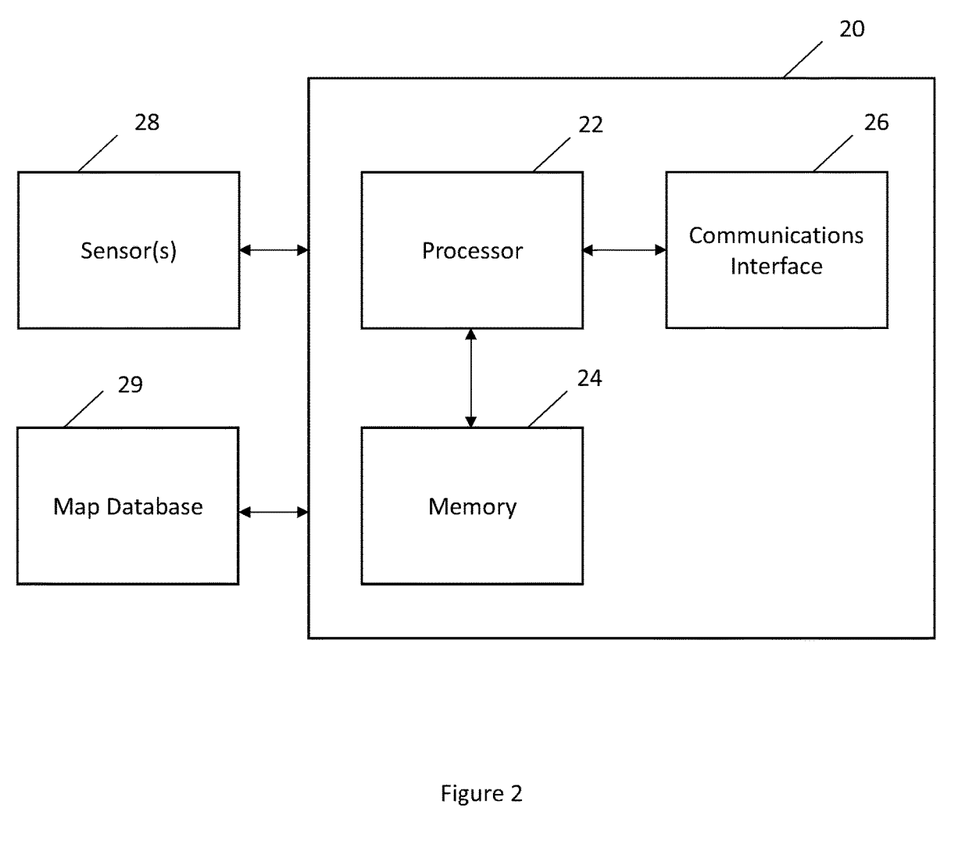
FIG. 2 is a block diagram of an apparatus that may be specifically configured in accordance with an example embodiment of the present disclosure.

As illustrated in FIG. 2, the apparatus 20 of an example embodiment includes, is associated with or is otherwise in communication with a processor 22, a memory device 24 and optionally a communication interface 26. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus. Additionally or alternatively, the communication interface may be configured to communicate in communication with any of various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The apparatus 20 of an example embodiment may also include one or more sensors 28. However, the sensor(s) of the embodiment depicted in FIG. 2 are separate from the apparatus, but in communication with the apparatus, such as via the communication interface 26.

The apparatus 20 of an example embodiment may also optionally include or be in communication with a map database 29 that represents road segments in a geographic area and that may be utilized, for example, to identify a geographic region within which a notification of the type described below may be provided. In this regard, the map database contains map data that indicates attributes of the road segments. The map database may also include map data indicative of sidewalks or other types of pedestrian segments, as well as open areas, such as grassy regions or plazas.

The map database 29 may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 29 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation.

As mentioned above, the map database 29 may be a master geographic database, but in alternate or complementary embodiments, a client side map database may represent a compiled navigation database that may be used in or with a drone to provide navigation and/or map-related functions. In such a case, the map database can be downloaded or stored on the drone which can access the map database through a wireless or wired connection, such as a communications network.

Figure 3:
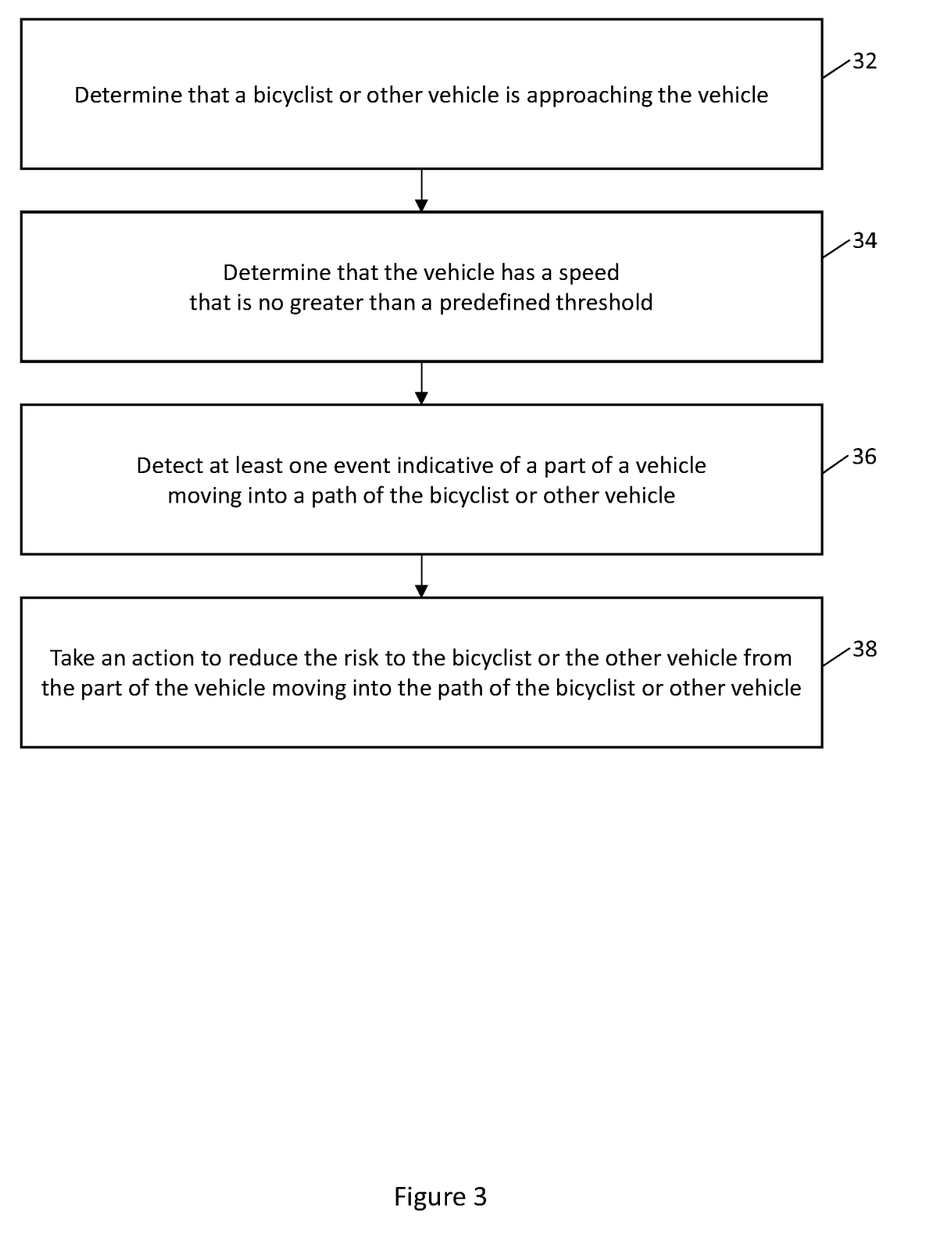
FIG. 3 is a flowchart illustrating operations performed, such as by the apparatus of FIG. 2, in order to detect at least one event indicative of a part of vehicle moving into the path of a bicyclist or another vehicle and to take an action in response in accordance with an example embodiment of the present disclosure.

Referring now to FIG. 3, the operations performed, such as by the apparatus 20 of FIG. 2, in accordance with an example embodiment are depicted. As shown in block 36 of FIG. 3, the apparatus includes means, such as the processor 22, at least one sensor 28 or the like, for detecting at least one event indicative of a part of a vehicle moving into the path of travel of an approaching bicyclist or other vehicle, such as an automobile, a truck or the like. As described below in relation to the embodiments of FIGS. 4 and 5, a variety of events and, in some embodiments, a variety of sequences of events, may be detected and identified to be indicative of a part of a vehicle moving into the path of travel of an approaching bicyclist or other vehicle. In some embodiment, the apparatus includes the one or more sensors for detecting the events. In other embodiments, however, the sensors or at least some of the sensors are separate from the apparatus, but the apparatus, such as the communication interface 26, is configured to be in communication with the sensors or to otherwise receive information based upon the observations of the sensor(s). In this embodiment in which the apparatus and the sensors are separate, the apparatus, such as the processor, is configured to detect at least one event based upon an evaluation of the information received by the processor, via the communication interface, relating to the observations of the sensor(s).

For example, the vehicle 12 that is moving into the path of travel of a bicyclist or other vehicle may include one or more sensors 28 for detecting respective events indicative of the part of the vehicle moving into the path of travel. In this example embodiment, the one or more sensors onboard the vehicle may communicate, directly or indirectly, with the apparatus 20, such as via communication interface 26, in order to provide information that is at least based upon observations of the sensors. Additionally or alternatively, the bicycle or other vehicle that is approaching the vehicle that is to subsequently move into the path of travel include one or more sensors. Still further, one or more sensors may be fixed in position and associated with a geographic region, e.g., a city block. In this example embodiment, a smart street lamp 16, a traffic control device, e.g., traffic lights, or other structure along the road may include the sensor(s). In any of the foregoing embodiments, the sensors may communicate, directly or indirectly, with the apparatus, such as via communication interface, in order to provide information that is at least based upon observations of the sensors.

The vehicle 12 that is being observed in order to determine whether a part of the vehicle is moving into a path of travel of an approaching bicyclist or other vehicle has a speed that is no greater than a predefined threshold. For example, the vehicle may be parked and, as a result, have a speed of zero. Alternatively, the vehicle may have a relatively low speed, such as less than 10 miles per hour or less than 5 miles per hour, such as in an instance in which a vehicle has slowed and is attempting to park in a parking space or in an instance in which a vehicle that has been previously parked begins to slowly move out of the parking space. As such, the vehicle for which at least one event is detected that may be indicative of a part of the vehicle moving into the path of travel has a speed that is no greater than the predefined threshold, such as 10 miles per hour or, in one embodiment, 5 miles per hour.

The at least one event that is detected may be indicative of various parts of the vehicle moving into the path of travel of a bicyclist or other vehicle. For example, the at least one event that is detected may be indicative of a door of the vehicle being opened into the path of travel, such as described below in conjunction with the embodiment of FIG. 4. Alternatively, the at least one event that is detected may be indicative of the vehicle subsequently pulling out from the parking space, such that a portion of the body of the vehicle moves into the path of travel, such as described below in conjunction with the embodiment of FIG. 5.

As show in block 38 of FIG. 3, in response to the detection of the at least one event, the apparatus 20 includes means, such as the processor 22 or the like, for taking an action to reduce a risk of accident, such as the risk to a person outside the vehicle or the risk to another vehicle proximate the vehicle, attributable to a part of a vehicle moving into the path of travel. Various actions may be taken including, for example, one or both of: the provision of an alert as to the vehicle that was detected to subsequently move into the path of travel of a bicyclist or another vehicle, and/or at least the temporary prevention of the movement of the vehicle into the path of travel of the bicyclist or the other vehicle. In an instance in which an alert is provided to the bicyclist or the other vehicle, the bicyclist or the other vehicle is provided notification so as to be forewarned and to permit action to be taken to reduce the risk of a traffic accident. For example, the bicyclist or the other vehicle may slow in advance of the parked vehicle. Additionally or alternatively, the bicyclist or the other vehicle may shift over in the lane of travel so as to move further away from the vehicle, thereby increasing the distance between the bicyclist or the other vehicle and the parked vehicle. Additionally or alternatively, the bicyclist or the other vehicle may take into account other traffic on the road so as to have determined in advance the route to be taking if the vehicle that was previously parked should proceed to move into the path of travel.

In an embodiment in which an alert is provided to another vehicle approaching the parked vehicle, the other vehicle may be manually driven. Thus, the alert provided to the other vehicle may notify the driver or other occupant of the other vehicle that the parked vehicle has been detected to subsequently move into the path of travel such that the driver may be forewarned and take appropriate action. Alternatively, the other vehicle may be an autonomous or semi-autonomous vehicle. In this embodiment, the alert provided to the other vehicle may cause the other vehicle to automatically take action to minimize the risk of a traffic accident, such as by slowing and/or altering its path of travel so as to be further from the parked vehicle.

Additionally or alternatively, in an instance in which the alert is provided to an occupant of the parked vehicle that is detected to otherwise subsequently move into the path of travel of the bicyclist or the other vehicle, the vehicle, such as the occupant of the vehicle, may again review their surroundings and identify the oncoming bicyclist or the other vehicle prior to moving into the path of travel. Alternatively, in an instance in which the parked vehicle is configured to operate autonomously or semi-autonomously, the alert to the parked vehicle may cause the parked vehicle to automatically discontinue or at least defer its preparations for opening a door or pulling into the path of travel, at least until the approaching bicyclist or other vehicle has passed.

Various types of alerts may be provided. For example, the apparatus 20, such as the processor 22, the communication interface 26 or the like, may be configured to cause a signal to be transmitted to an approaching bicyclist, the other vehicle that is approaching and/or the parked vehicle. The signal may cause an audible, visual and/or tactile alarm or warning to be provided to the bicyclist or the driver or other occupant of the vehicles, such as via a mobile device, e.g., smart phone, personal navigation device or the like, carried by the bicyclist or the driver or other occupant of the vehicles. For example, the apparatus, such as the processor, the communication interface or the like, may be configured to cause the parked vehicle to provide an audible and/or visual alarm or warning, such as by causing the horn of the parked vehicle to honk and/or causing the lights of the parked vehicle to blink, thereby alerting the driver of the parked vehicle and/or an approaching bicyclist or other vehicle of the risk associated with movement of the parked vehicle into the path of travel. Alternatively, in an instance in which the parked vehicle and/or the approaching vehicle is an autonomous or semi-autonomous vehicle, the signal transmitted to the parked vehicle and/or the approaching vehicle may not necessarily cause an alarm or warning to be presented, but may advise the autonomous or semi-autonomous vehicle of the determination that the vehicle will subsequently move into the path of travel such that appropriate measures may be taken to reduce the risk of a traffic accident.

In addition to or instead of the provision of an alert, the apparatus 20, such as the processor 22, may be configured to at least temporarily prevent the movement of the vehicle into the path of travel of the bicyclist or the other vehicle. In an instance in which the door of the vehicle is determined to be opened, the apparatus, such as the processor, may be configured to cause the doors of the vehicle to be temporarily locked, thereby preventing the door from being opened, at least until the approaching bicyclist or other vehicle has passed the parked vehicle. In this regard, the apparatus, such as the processor, may be in communication with door lock or security system of the parked vehicle in order to cause the doors of the vehicle to be temporarily locked. Additionally or alternatively, the doors of the parked vehicle may not be locked, but the apparatus, such as the processor, may be configured to cause the occupant(s) of the parked vehicle to be advised, such as via an audio alert played over the entertainment system of the vehicle, as to the approaching bicyclist or other vehicle and the need to keep the doors closed until the bicyclist or other vehicle has passed the parked vehicle.

Alternatively, in an instance in which the vehicle is determined to subsequently pull out into the lane of traffic, the apparatus, such as the processor, may be configured to prevent the vehicle from pulling out into the lane of traffic, at least until the approaching bicyclist or other vehicle has passed the parked vehicle. In this regard, the apparatus, such as the processor, may be in communication with the engine control system of the parked vehicle in order to cause the transmission to be placed in (or be remain in) park and/or to cause the engine to be turned off, at least until the approaching bicyclist or other vehicle has passed the parked vehicle.

Prior to detecting at least one event and as also shown in blocks 32 and 34 of FIG. 3, the apparatus 20 of an example embodiment may also include means, such as the processor 22, the sensor(s) 28 or the like, for determining that a bicyclist or the other vehicle is approaching the parked vehicle 12 and means, such as the processor, the sensor(s) or the like, for determining that the vehicle has a speed that is no greater than the predefined threshold. For example, the apparatus, such as the processor, may be in communication with a sensor, such as an image sensor, e.g., a camera, a proximity sensor, a radar sensor, an infrared sensor, a light detection and ranging (LIDAR) sensor or the like, for determining that a bicyclist or another vehicle is approaching the parked vehicle. Further, the apparatus, such as the processor, may be in communication with a sensor, such as a speed sensor, onboard the vehicle and may monitor the speed of the vehicle. In this example embodiment, the apparatus, such as the processor, is configured to detect the at least one event in response to, that is, contingent upon the determination that a bicyclist or another vehicle is approaching the vehicle and also in response to the determination that the vehicle has a speed that is no greater than the predefined threshold.

Once an action has been taken in response to the detection of one or more events indicative of at least a part of a vehicle subsequently moving into the path of a bicyclist or another vehicle, such as the provision of an alert, the apparatus 20 of an example embodiment also includes means, such as the processor 22 or the like, for determining whether the one or more events continue to be detected following the notification that provided by the alert that was triggered. The one or more events for which a determination is made as to whether the one or more events are continuing following the notification may include events, such as described above, indicative of the at least a part of the vehicle subsequently moving into the path of a bicyclist or other vehicle, such as one or more events indicative of the door of the vehicle being opened and/or the vehicle subsequently pulling out, from a stationary position, into a lane of travel.

In an instance in which the one or more events continue to be detected following the notification, the apparatus 20 of this example embodiment includes means, such as the processor 22, the communication interface 26 or the like, for triggering another action to be taken. The initial action that is taken and the another action that is taken upon a determination that the one or more events have continued following the notification may be the same type of action, such as an initial warning and a subsequent more severe warning, or different types of actions, such as an initial alert followed by causing the vehicle to be at least temporarily prevented from moving into the path of the bicycle in the event that the initial alert does not cause the one or more events indicative of at least a part of the vehicle subsequently moving into the path of a bicyclist or other approaching vehicle to be discontinued. Upon determining that the approaching bicyclist or other vehicle has passed the parked vehicle, the apparatus, such as the processor or the like, may be configured to cause not only the initial action that is triggered, but any subsequent action that is triggered by the continuation of the one or more events following the notification that are indicative of a part of the vehicle subsequently moving into the path of travel to be discontinued. In response to determining that the bicyclist or other vehicle has passed the parked vehicle, the apparatus of some embodiments may include means, such as the processor or the like, for providing an indication to the parked vehicle or an occupant of the parked vehicle that the bicyclist or other vehicle has passed the parked vehicle, such as by causing the entertainment system of the parked vehicle to generate an audible signal, e.g., "all clear". Similarly, in an instance in which the bicyclist or other vehicle stopped or turned off of the road prior to passing the parked vehicle, the apparatus of some embodiments may also include means, such as the processor or the like, for providing an indication to the parked vehicle or an occupant of the parked vehicle that the bicyclist or other vehicle is no longer approaching the parked vehicle, such as by causing the entertainment system of the parked vehicle to generate an audible signal, e.g., "all clear".

Figure 4:
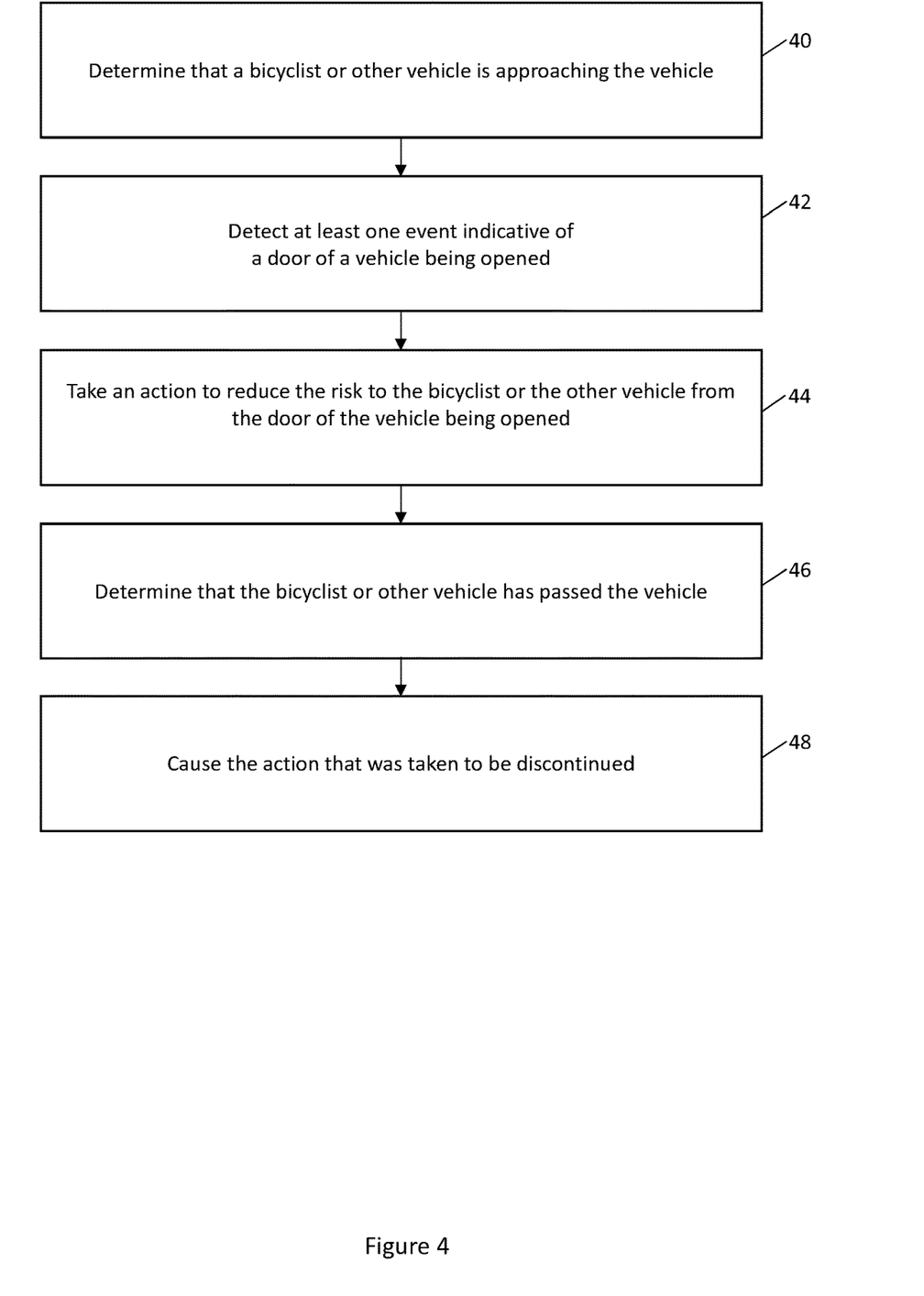
FIG. 4 is a flow chart illustrating operations performed, such as by the apparatus of FIG. 2, in order to detect at least one event indicative of a door of a vehicle being subsequently opened and then take an action in response in accordance with another example embodiment of the present disclosure.

As indicated above, various parts of a vehicle 12 may move into the path of travel of a bicyclist or other vehicle. For example, FIG. 4 depicts the operations performed, such as by the apparatus 20 of FIG. 2, in order to detect and to respond to at least one event indicative of a door of a vehicle being opened. In this embodiment, the apparatus includes means, such as the processor 22, at least one sensor 28 or the like, for detecting at least one event indicative of a door of a vehicle being opened. See block 42 of FIG. 4. In this regard, the at least one event may occur with the actual opening of the door, such as the partial opening of the door that precedes the full opening of the door, and/or may occur prior to the actual opening of the door and serves to predict the subsequent opening of the door. A variety of events may be detected that are indicative, either individually or upon occurrence in a predefined sequence, of the door of a vehicle being opened. In one embodiment, the event(s) that are detected that are indicative of the door of the vehicle being opened are detected from outside of the vehicle, while in other embodiments, the event(s) that are detected that are indicative of the door of the vehicle being opened are detected internally by the vehicle. In still other embodiments, the event(s) that are detected that are indicative of the door of the vehicle being opened are detected both externally and internally relative to the vehicle.

For example, the event may be the detection of a person onboard the vehicle, such as a driver or a passenger, who may open the door of the vehicle. In order to detect the person onboard the vehicle, the sensor 28 may include an image sensor for capturing images of the vehicle and its interior with the apparatus 20, such as the processor 22, being configured to analyze the images to detect the person onboard the vehicle. Other events that may be indicative of the door of a vehicle being opened include the transmission of the vehicle being in park and/or the engine of the vehicle being off. In order to detect the state of the transmission and the engine, one or more sensors, such as one or more sensors onboard the vehicle, may be configured to monitor the transmission and/or the engine. An additional event that may be indicative of the door of the vehicle being opened includes the vehicle having come to a halt within the first predefined period of time. In this regard, the first predetermined period of time is a period of time immediately prior to the current time and is based upon the premise that a vehicle that has recently parked, such as by being parked within the first predetermined period of time, is more likely to have an occupant open the door of the vehicle, such as to exit the vehicle, than a vehicle that has been parked for a longer period of time, such as by having been parked for greater than the first predetermined period of time. Various sensors may be utilized to determine the timing with which a vehicle comes to a halt including one or more sensors onboard the vehicle to detect motion of the vehicle and/or image sensors for capturing images of the vehicle over time that may then be analyzed by the apparatus, such as the processor, to determine the time at which the vehicle came to a halt.

Another example of an event that may be indicative of the door of the vehicle being opened is a determination that a part of the vehicle was recently operated. For example, an infrared or other heat sensor may be configured detect that a part of the vehicle was recently operated and, as a result, is hot, such as in an instance in which the hood, exhaust pipe or tires of the vehicle has a temperature greater than a predefined threshold. Other examples of events that may be indicative of the door of the vehicle being opened may be unique to instances in which the vehicle is a taxi or instances in which the vehicle provides ride share services. For example, lettering or signage on the vehicle that is indicative of the vehicle being a taxi, such as detected by an image sensor, may also be an event indicative of the door of the vehicle being opened, since the door of a taxi may open even though the taxi continues to idle. As another example, a medallion, decal or sign carried by the vehicle that is indicative of the vehicle providing ride share services may also be an event indicative of the door of the vehicle being opened, since the door of a vehicle providing ride share services may open even though the vehicle continues to idle.

While any one or more of these events may be indicative of the door of the vehicle being opened, the apparatus 20, such as the processor 22, of some embodiments may require a sequence of two or more events to occur, such as in a predefined order, in order to determine that the door of a vehicle is likely to be opened. For example, a sequence of events indicative of the door of the vehicle being opened may include the vehicle having come to a halt within the first predefined period of time, prior to the transmission of the vehicle being put in park, the engine of the vehicle being turned off and a person remaining onboard the vehicle. In this embodiment, in an instance in which each of the foregoing events is detected in this predefined order, the resulting sequence of events indicates that the door of the vehicle is likely to be opened.

As shown in block 44 of FIG. 4 and in response to detection of the at least one event, the apparatus 20 includes means, such as the processor 22 or the like, for taking an action. Various actions may be taken including, for example, one or both of: the provision of an alert as to the door of the vehicle being opened into the path of travel of a bicyclist or another vehicle, and/or at least the temporary prevention of the door of the vehicle from being opened into the path of travel of the bicyclist or the other vehicle. Further details regarding the manner in which an alert is provided and/or the door of the vehicle is at least temporarily prevented from being opened are described above in relation to the embodiment of FIG. 3. As also described above in conjunction with the embodiment with FIG. 3 and as shown in block 40 of FIG. 4, the apparatus of this example embodiment may also include means, such as the processor, at least one sensor 28 or the like, for determining that a bicyclist or another vehicle is approaching the vehicle. In this example embodiment, the detection of at least one event is responsive to and contingent upon the determination that the bicyclist or another vehicle is approaching the vehicle.

As shown in block 46 of FIG. 4, the apparatus 20 of an example embodiment also includes means, such as the processor 22, at least one sensor 28 or the like, for determining that the bicyclist or other vehicle has passed the parked vehicle 12. In order to determine that the bicyclist or other vehicle has passed the parked vehicle, one or more sensors, such as an image sensor, a proximity sensor, a radar sensor, an infrared sensor, a LIDAR sensor or the like, may capture observations that may, in turn, be analyzed by the processor in order to determine that the bicyclist or other vehicle has passed the parked vehicle.

In response to determining that the bicyclist or other vehicle has passed the parked vehicle 12, the apparatus 20 also includes means, such as the processor 22 or the like, for causing the action that was taken to be discontinued. See block 48. For example, in an instance in which an alert was provided as to the door being opened, the alert may be discontinued upon determining that the bicyclist or other vehicle has passed the parked vehicle. As another example, in an instance in which the door of the vehicle was prevented from being opened, the door may again be permitted to be opened once the bicyclist or other vehicle has been determined to have passed the parked vehicle.

Figure 5:
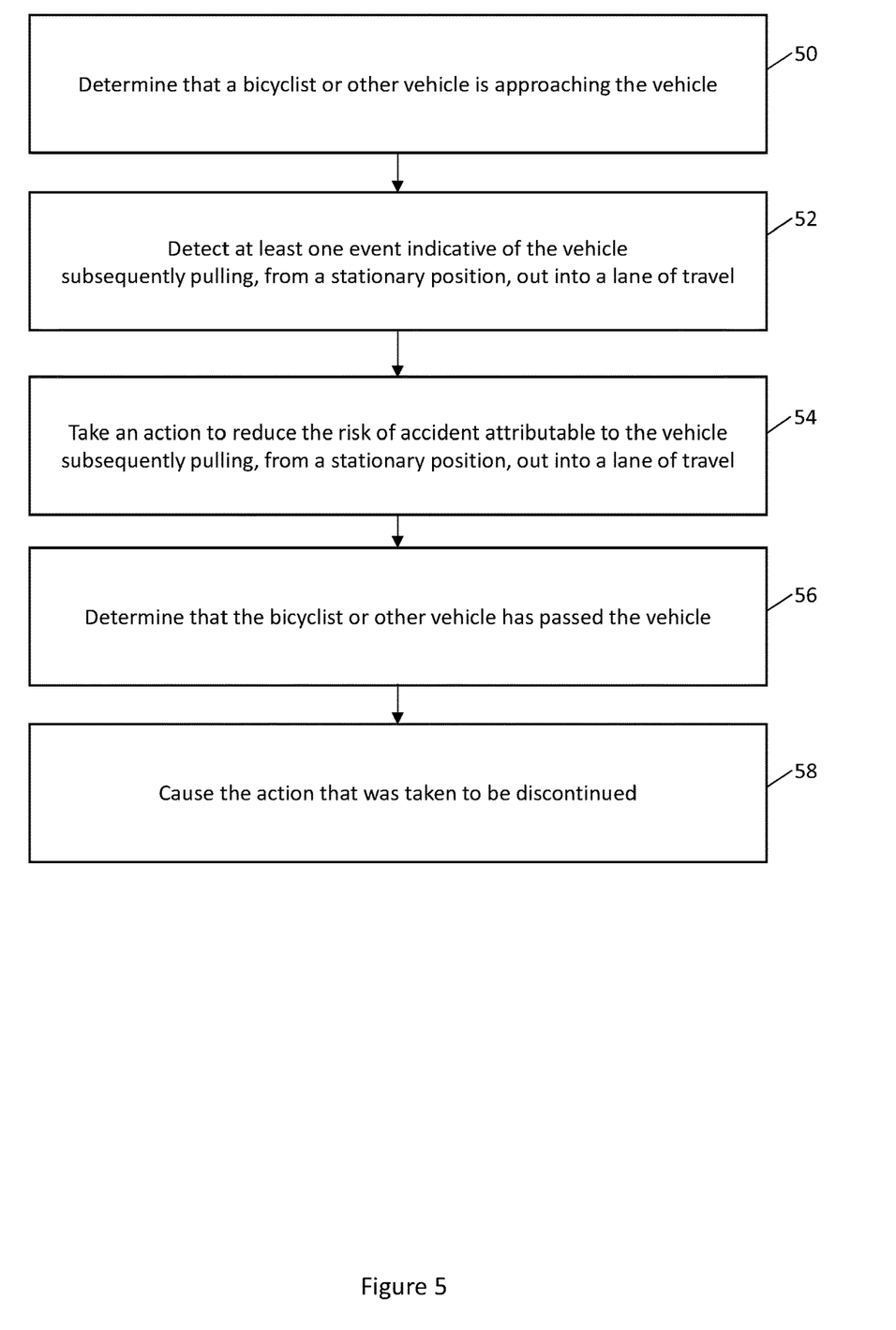
FIG. 5 is a flow chart illustrating operations performed, such as by the apparatus of FIG. 2, in order to detect at least one event indicative of a vehicle subsequently pulling from a parking space out into a lane of travel and then take an action in response in accordance with an example embodiment of the present disclosure.

In another example embodiment, the part of the vehicle that moves into the path of the vehicle is the body of the vehicle itself, such as in an instance in which the vehicle pulls out of the parking space into the path of travel of the bicyclist or another vehicle. In this example embodiment, FIG. 5 depicts the operations performed, such as by the apparatus 20 of FIG. 2, in order to detect and to respond to at least one event indicative of a vehicle subsequently pulling, from a stationary position, out into a lane of travel. In this embodiment, the apparatus includes means, such as the processor 22, at least one sensor 28 or the like, for detecting at least one event indicative of a vehicle subsequently pulling, from a stationary position, out into a lane of travel. See block 52 of FIG. 5. In this regard, the at least one event occurs prior to the vehicle actually pulling into the lane of travel and serves to predict the subsequent movement of the vehicle so as to pull from a parking space into a lane of travel. A variety of events may be detected that are indicative, either individually or upon occurrence in a predefined sequence, of the vehicle pulling out into a lane of travel.

For example, the event may be the detection of a person onboard the vehicle 12, such as a driver, who may cause the vehicle to pull out from the parking space into a lane of travel. In order to detect the person onboard the vehicle, the sensor 28 may include an image sensor for capturing images of the vehicle and its interior with the apparatus 20, such as the processor 22, being configured to analyze the images to detect the person onboard the vehicle. Other events that may be indicative of the vehicle pulling out from a parking space into a lane of traffic include the transmission of the vehicle being in gear, the engine of the vehicle running and/or the brakes of the vehicle being released. In order to detect the state of the transmission, the engine and the brakes, one or more sensors, such as one or more sensors onboard the vehicle, may be configured to monitor the transmission, the engine and/or the brakes. In some embodiments, the length of time that the engine of the vehicle has been running may also be considered as an event indicative of the vehicle subsequently pulling out into a lane of travel in an instance in which the engine has been running for at least a predetermined amount of time. Additional events that may be indicative of the vehicle pulling out from a parking space into a lane of traffic include the steering wheel of the vehicle having been moved within a first predefined period of time and/or wheel(s) of the vehicle having been moved within the first predefined period of time. The first predefined period of time is a period of time immediately prior to the current time and is based upon the premise that the driver of a vehicle that is preparing to pull out of a parking space frequently turns the steering wheel which, in turn, causes wheel(s) of the vehicle to be correspondingly turned. In order to detect movement of the steering wheels and/or the wheel(s), one or more sensors, such as one or more sensors onboard the vehicle, may be configured to monitor the steering wheel and/or the wheel(s). Another event that may be indicative of the vehicle pulling out from a parking space into a lane of traffic includes a person having entered the vehicle within a second predefined period of time. The second predefined period of time is a period of time immediately prior to the current time and is based upon the premise that the driver or other occupant of a vehicle frequently enters the vehicle shortly before the vehicle pulls out of a parking space and into a lane of traffic. Various sensors may be utilized to determine the timing with which a person enters a vehicle including image sensors for capturing images of the vehicle over time that may then be analyzed by the apparatus, such as the processor, to determine the time at which a person entered the vehicle.

While any one or more of these events may be indicative of the vehicle subsequently pulling, from a stationary position, out into a lane of travel, the apparatus 20, such as the processor 22, of some embodiments may require a sequence of two or more events to occur, such as in a predefined order, in order to determine that the vehicle is likely to subsequently pull out from a parking space into a lane of travel. For example, a sequence of events indicative of the vehicle subsequently pulling, from a stationary position, into a lane of traffic may include a person having entered the vehicle within the first predefined period of time, prior to the transmission of the vehicle being put in gear and the steering wheel being turned. In this embodiment, in an instance in which each of the foregoing events is detected in this predefined order, the resulting sequence of events indicates that the vehicle is likely to subsequently pull, from a stationary position, out into a lane of traffic.

As described above in relation to FIG. 3 and as shown in block 54 of FIG. 5 and in response to detection of the at least one event, the apparatus 20 includes means, such as the processor 22 or the like, for taking an action. Various actions may be taken including, for example, one or both of: the provision of an alert as to the vehicle subsequently pulling out, from a stationary position, into the path of travel of a bicyclist or another vehicle, and/or at least the temporary prevention of the vehicle from subsequently pulling out, from a stationary position, into the path of travel of the bicyclist or the other vehicle. As also described above in conjunction with the embodiment with FIG. 3 and as shown in block 50 of FIG. 5, the apparatus of this example embodiment may also include means, such as the processor, at least one sensor 28 or the like, for determining that a bicyclist or another vehicle is approaching the vehicle. In this example embodiment, the detection of at least one event is responsive to and contingent upon the determination that the bicyclist or another vehicle is approaching the vehicle. As described above and as also shown in block 56 of FIG. 7, the apparatus of an example embodiment also includes means, such as the processor, at least one sensor 28 or the like, for determining that the bicyclist or other vehicle has passed the parked vehicle. In response to determining that the bicyclist or other vehicle has passed the parked vehicle, the apparatus also includes means, such as the processor or the like, for causing the action that was taken to be discontinued. See block 58. For example, in an instance in which an alert was provided as to the vehicle subsequently pulling out, from a stationary position, into the path of travel of a bicyclist or another vehicle, the alert may be discontinued upon determining that the bicyclist or other vehicle has passed the parked vehicle. As another example, in an instance in which the vehicle was prevented from subsequently pulling out, from a stationary position, into the path of travel of a bicyclist or another vehicle, the vehicle may again be permitted to be driven, such as by turning the engine on and/or permitting the gear, other than park, to be selected once the bicyclist or other vehicle has been determined to have passed the parked vehicle.

A method, apparatus 20 and computer program product are therefore provided in accordance with an example embodiment in order to detect a least one event indicative of a part of a vehicle moving into the path of travel of a bicyclist or other vehicle and, in response to the detection the at least one event, to take an action to reduce the risk of accident attributable to the part of the vehicle moving into the path of travel, such as by providing an alert as to the part of a vehicle subsequently moving into the path of travel or to at least temporarily preventing the part of a vehicle subsequently moving into the path of travel. Based upon the alert, the bicyclist, the driver of the other vehicle and/or the driver of the vehicle that was previously parked may be forewarned such that evasive action may be taken, if necessary, at an earlier stage and in a more calculated manner so as to reduce the risk of a traffic accident.

FIGS. 3-5 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, while the various embodiments have been primarily described in conjunction with vehicles that are manually driven, the method, apparatus 20 and computer program product of an alternative embodiment operates in conjunction with one or more motorized vehicles that operate autonomously or semi-autonomously. For example, the vehicle 12 that is parked and that is being investigated to determine whether a part of the vehicle is anticipated to pull into the path of travel of a bicyclist or other vehicle may be an autonomous or semi-autonomous vehicle. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
   detecting one or more events indicative of a door of a vehicle being opened, wherein the detecting of the one or more events indicative of the door of the vehicle being opened comprises detecting one or more events selected from a door opening prediction group including: a person being onboard the vehicle, a transmission of the vehicle being in park, an engine of the vehicle being off, the vehicle having come to a halt within a first predefined period of time, a part of the vehicle being indicative of having been recently operated, a person having entered the vehicle within a second predefined period of time, a detection of lettering or signage on the vehicle indicative of the vehicle being a taxi, and a detection of a medallion, decal or sign carried by the vehicle indicative of the vehicle providing ride share services, wherein, in an instance in which one or more events are detected from the door opening prediction group, detecting one or more events comprises detecting a sequence of events selected from the door opening prediction group taking place in a predefined order while the vehicle is stationary that are indicative of the door of the vehicle being opened, and wherein the sequence of events comprises a first event selected from the door opening prediction group followed by one or more additional events selected from the door opening prediction group; and
   responsive to detection of the one or more events, taking an action to reduce a risk to a person outside the vehicle or another vehicle proximate the door of the vehicle being opened.

2. The method according to claim 1 further comprising determining that a bicyclist or another vehicle is approaching the vehicle, and wherein the detection of one or more events is responsive to a determination that the bicyclist or the another vehicle is approaching the vehicle.

3. The method according to claim 2 wherein taking the action comprises causing at least one of the bicyclist or the another vehicle approaching the vehicle or the person onboard the vehicle to be provided notification.

4. The method according to claim 3 further comprising:
determining whether one or more events continue to be detected following the notification that is indicative of the door of the vehicle being opened; and
in an instance in which the one or more events continue to be detected, triggering another action to be taken to at least temporarily prevent the door of the vehicle from being at least fully opened.

5. The method according to claim 4 wherein triggering another action comprises causing the door of the vehicle to be locked to prevent the door of the vehicle from being opened.

6. The method according to claim 4 further comprising:
determining that the bicyclist or the another vehicle has passed the vehicle; and
responsive to a determination that the bicyclist or the another vehicle has passed the vehicle, causing the another action to be discontinued.

7. A method according to claim 1 further comprising causing a warning to be provided to a device carried by the person outside the vehicle or the another vehicle proximate the door of the vehicle being opened.

8. An apparatus comprising at least one processor and at least one non-transitory memory including computer program code instructions stored therein, the computer program code instructions configured to, when executed by the at least one processor, cause the apparatus at least to:
detect one or more events indicative of a vehicle subsequently pulling, from a stationary position, out into a lane of travel, wherein the one or more events are selected from a group including: the vehicle having come to a halt, a person having entered the vehicle, a detection of lettering or signage on the vehicle indicative of the vehicle being a taxi, a detection of a medallion, decal or sign carried by the vehicle indicative of the vehicle providing ride share services, brakes of the vehicle having been released, and a steering wheel of the vehicle or a wheel of the vehicle having been moved; and
responsive to detection of the one or more events, take an action to reduce a risk of accident attributable to the vehicle pulling out into the lane of travel.

9. The apparatus according to claim 8 wherein the computer program code instructions are further configured to, when executed by the at least one processor, cause the apparatus to determine that a bicyclist or another vehicle is approaching the vehicle, wherein the detection of one or more events is responsive to a determination that the bicyclist or the another vehicle is approaching the vehicle.

10. The apparatus according to claim 9 wherein the computer program code instructions are configured to take the action by causing at least one of the bicyclist or the another vehicle approaching the vehicle or the person onboard the vehicle to be provided notification.

11. The apparatus according to claim 10 wherein the computer program code instructions are further configured to, when executed by the at least one processor, cause the apparatus to:
determine whether one or more events continue to be detected following the notification that is indicative of the vehicle subsequently pulling out into the lane of travel; and
in an instance in which the one or more events continue to be detected, trigger another action to be taken to at least temporarily prevent the vehicle from pulling out into the lane of travel.

12. The apparatus according to claim 11 wherein the computer program code instructions are configured to trigger the another action to be taken by causing a transmission of the vehicle to be placed in park or an engine of the vehicle to be turned off to prevent the vehicle from pulling out into the lane of travel.

13. The apparatus according to claim 11 wherein the computer program code instructions are further configured to, when executed by the at least one processor, cause the apparatus to:
determine that the bicyclist or the another vehicle has passed the vehicle; and
responsive to a determination that the bicyclist or the another vehicle has passed the vehicle, cause the another action to be discontinued.

14. The apparatus according to claim 8 wherein the computer program code instructions are configured to detect one or more events by detecting a sequence of events, while the vehicle is stationary, indicative of the vehicle subsequently pulling out into the lane of travel.

15. The apparatus according to claim 14 wherein the computer program code instructions are configured to detect one or more events indicative of the vehicle subsequently pulling out into the lane of travel by detecting one or more events selected from a group consisting of: the person being onboard the vehicle, a transmission of the vehicle being in gear, an engine of the vehicle running, brakes of the vehicle having been released and a steering wheel of the vehicle or a wheel of the vehicle having been moved within a first predefined period of time.

16. A computer program product comprising at least one non-transitory computer-readable storage medium having computer-executable program code instructions stored therein, the computer-executable program code instructions comprising program code instructions configured to:
detect one or more events indicative of at least a part of a vehicle subsequently moving into a path of a bicyclist, wherein the one or more events are selected from a group including: the vehicle having come to a halt within a first predefined period of time, a person having entered the vehicle within a second predefined period of time, a detection of lettering or signage on the vehicle indicative of the vehicle being a taxi, a detection of a medallion, decal or sign carried by the vehicle indicative of the vehicle providing ride share services, brakes of the vehicle having been released and a steering wheel of the vehicle or a wheel of the vehicle having been moved within a third predefined period of time; and
responsive to detection of the one or more events, take an action to reduce a risk to the bicyclist attributable to the at least a part of the vehicle subsequently moving into the path of the bicyclist.

17. The computer program product according to claim 16 wherein the computer-executable program code instructions further comprise program code instructions configured to determine that the bicyclist is approaching the vehicle, wherein the detection of one or more events is responsive to a determination that the bicyclist is approaching the vehicle.

18. The computer program product according to claim 16 wherein the program code instructions configured to take the action comprise program code instructions configured to cause at least one of the bicyclist approaching the vehicle or the person onboard the vehicle to be provided a notification, and wherein the computer-executable program code instructions further comprise program code instructions configured to:

determine whether one or more events continue to be detected following the notification as to the at least a part of the vehicle subsequently moving into the path of the bicyclist; and in an instance in which the one or more events continue to be detected, trigger another action to be taken to at least temporarily prevent the at least the part of the vehicle from subsequently moving into the path of the bicyclist.

19. The computer program product according to claim 16 wherein the at least a part of the vehicle comprises a door of the vehicle.

20. The computer program product according to claim 16 wherein the program code instructions configured to take the action comprise program code instructions configured to cause a warning to be provided to a device carried by the bicyclist.

\* \* \* \* \*